(12) United States Patent
Shono

(10) Patent No.: US 7,006,140 B2
(45) Date of Patent: Feb. 28, 2006

(54) DIGITAL STILL CAMERA WITH SHIFTING FOCUS LENS

(75) Inventor: Tetsuji Shono, Saitama (JP)

(73) Assignee: PENTAX Corporation, Tokyo (JP)

( * ) Notice: Subject to any disclaimer, the term of this patent is extended or adjusted under 35 U.S.C. 154(b) by 777 days.

(21) Appl. No.: 09/886,103

(22) Filed: Jun. 22, 2001

(65) Prior Publication Data

US 2001/0055488 A1    Dec. 27, 2001

(30) Foreign Application Priority Data

Jun. 23, 2000    (JP)    ............................ P2000-188945

(51) Int. Cl.
- *H04N 5/232* (2006.01)
- *H04N 5/225* (2006.01)
- *G03B 13/00* (2006.01)
- *G03B 17/00* (2006.01)
- *G03B 19/12* (2006.01)

(52) U.S. Cl. ...................... 348/349; 348/344; 396/128; 396/447; 396/355

(58) Field of Classification Search ................ 348/360, 348/349, 353, 354, 343, 344, 363; 396/79, 396/114, 128, 447, 355, 356, 358
See application file for complete search history.

(56) References Cited

U.S. PATENT DOCUMENTS

| | | | | |
|---|---|---|---|---|
| 4,599,653 A | * | 7/1986 | Kimura et al. | ............... 348/349 |
| 4,949,117 A | * | 8/1990 | Van Heyningen et al. | .. 396/100 |
| 5,150,215 A | * | 9/1992 | Shi | .............................. 348/344 |
| 5,212,514 A | * | 5/1993 | Goto | ........................... 396/114 |
| 5,597,999 A | * | 1/1997 | Kinba et al. | ................. 396/125 |
| 5,784,656 A | * | 7/1998 | Utagawa | ...................... 396/272 |
| 5,995,144 A | * | 11/1999 | Sasakura | .................... 348/350 |
| 6,091,450 A | * | 7/2000 | Hirasawa | .................... 348/372 |
| 6,118,948 A | * | 9/2000 | Akamatsu et al. | .......... 396/104 |
| 6,157,781 A | * | 12/2000 | Konno et al. | ................ 348/342 |
| 6,453,124 B1 | * | 9/2002 | Morimoto et al. | .......... 348/349 |
| 6,630,959 B1 | * | 10/2003 | Shono | ......................... 348/344 |
| 6,639,626 B1 | * | 10/2003 | Kubo et al. | .................. 348/335 |
| 6,741,284 B1 | * | 5/2004 | Shono | ......................... 348/349 |
| 2004/0155976 A1 | * | 8/2004 | Suda | ........................... 348/345 |

FOREIGN PATENT DOCUMENTS

JP          01155324 A   *  6/1989

* cited by examiner

*Primary Examiner*—Thai Tran
*Assistant Examiner*—John M. Villecco
(74) *Attorney, Agent, or Firm*—Greenblum & Bernstein, P.L.C.

(57) ABSTRACT

A digital still camera of the present invention has a photographing optical system, a body, an image sensor, a half mirror, a phase difference focus detector. The image sensor is arranged in the body and backward of the photographing optical system along an optical axis. The light-path space is formed between the photographing optical system and the image sensor along the optical axis, light from the photographing optical system passes through the light-path space and is received by the image sensor. The half mirror is provided along the optical axis in the light-path space and the phase difference focus detector is provided outside the light-path space. The half mirror is arranged in the light-path space such that all of the light directed from the photographing optical system to the image sensor substantially passes through the half mirror.

10 Claims, 14 Drawing Sheets

DIGITAL STILL CAMERA WITH SHIFTING FOCUS LENS

BACKGROUND OF THE INVENTION

1. Field of the Invention

The present invention relates to a digital still camera for recording a subject image as digital image data.

2. Description of the Related Art

In a digital still camera, an image sensor, such as a CCD (Charge-Coupled Device), is arranged at the rear of a photographing optical system, thus an object image is formed on the image sensor and is then recorded in a recording medium, such as a card memory. Further, an AF (Auto Focus) mechanism is provided in the camera. A focused subject image is obtained by the AF mechanism.

For the focus detecting method, a contrast detecting method, which detects a focus point in accordance with a contrast of the subject image, is usually applied. In this case, the image sensor serves as a photo-sensor for detecting the focus. However, when the subject image is not in an in-focus situation, it cannot be determined whether the subject image is focused in the background or foreground with respect to a focal plane. Therefore, to focus the subject image, focus lenses are shifted along an optical axis of the photographing optical system and the defocusing situation is determined in accordance with a contrast change caused by shifting the focus lenses. Therefore, a focus adjustment cannot be rapidly performed, especially when the subject is a moving-subject, or when a telephoto lens is used.

On the other hand, for another focus detecting method, a phase difference detecting method or a so called "phase-matching method" is known. This method is mainly applied in an SLR (Single Lens Reflex) type camera and is superior to the contrast focus detecting method. However, when constructing a SLR type of digital still camera by using an image sensor in place of a photographic film, various construction elements, such as a pentagonal roof prism, quick return mirror and sub-mirror, must be incorporated in the digital camera so that an inner construction of the camera becomes complicated and the assembly of the digital camera becomes troublesome.

SUMMARY OF THE INVENTION

Therefore, an object of the present invention is to provide a digital still camera, which is capable of performing the focus adjustment rapidly, and the inner construction of which is simplified.

A digital still camera of the present invention has a photographing optical system, a body, an image sensor, a half mirror, a phase difference focus detector, a focus adjuster, and a recording processor. The photographing optical system, which is usually provided in a lens barrel, forms a subject image by capturing a subject. The photographing optical system is connected to the body. The image sensor is arranged in the body and is backward of the photographing optical system along an optical axis. Note that, the optical axis is defined by the photographing optical system. The light-path space is formed between the photographing optical system and the image sensor along the optical axis, light from the photographing optical system passes through the light-path space and is received by the image sensor. The subject image is formed on a light-receiving area of the image sensor by the light from the photographing optical system. The half mirror is provided in the light-path space and directs the light from the photographing optical system toward the image sensor and toward a focus detecting direction different from the optical axis. The phase difference focus detector is provided outside the light-path space and along the focus detecting direction, and detects whether or not the subject image is focused in accordance with a phase difference obtained from light directed by the half mirror. Namely, the focus detecting is performed by the phase difference detecting method, in other words, the phase-matching method. The focus adjuster focuses the subject image in accordance with the phase difference. The recording processor exposes the image sensor for a given period and records the subject image as data in a recording medium provided in the body. Then, the half mirror is arranged in the light-path space such that all of the light directed from the photographing optical system to the image sensor substantially passes through the half mirror. According to the present invention, as the phase difference method, which is superior to the contrast method, is applied, the focus detecting and adjusting is rapidly performed. Further, as only the half mirror is needed to detect whether the subject image is focused and record the subject image, an inner construction of the digital still camera becomes simplified compared to the conventional SLR type camera.

On the other hand, according to another aspect of the present invention, a digital still camera has a photographing optical system, a body, an image sensor, a half mirror, and a phase difference focus detector. The photographing optical system, which is usually provided in a lens barrel, forms a subject image by capturing a subject. The photographing optical system is connected to the body. The image sensor is arranged in the body and is backward of the photographing optical system along an optical axis. Note that, the optical axis is defined by the photographing optical system. The light-path space is formed between the photographing optical system and the image sensor along the optical axis, light from the photographing optical system passes through the light-path space and is received by the image sensor. The subject image is formed on a light-receiving area of the image sensor by the light from the photographing optical system. The half mirror is provided in the light-path space and directs the light from the photographing optical system toward the image sensor and toward a focus detecting direction different from the optical axis. The phase difference focus detector is provided outside the light-path space and along the focus detecting direction, and detects whether or not the subject image is focused in accordance with a phase difference obtained from light directed by the half mirror. Namely, the focus detecting is performed by the phase difference detecting method, in other words, the phase-matching method. The focus adjuster focuses the subject image in accordance with the phase difference. The recording processor exposes the image sensor for a given period and records the subject image as data in a recording medium provided in the body. Then, the half mirror is arranged in the light-path space such that all of the light directed from the photographing optical system to the image sensor substantially passes through the half mirror.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
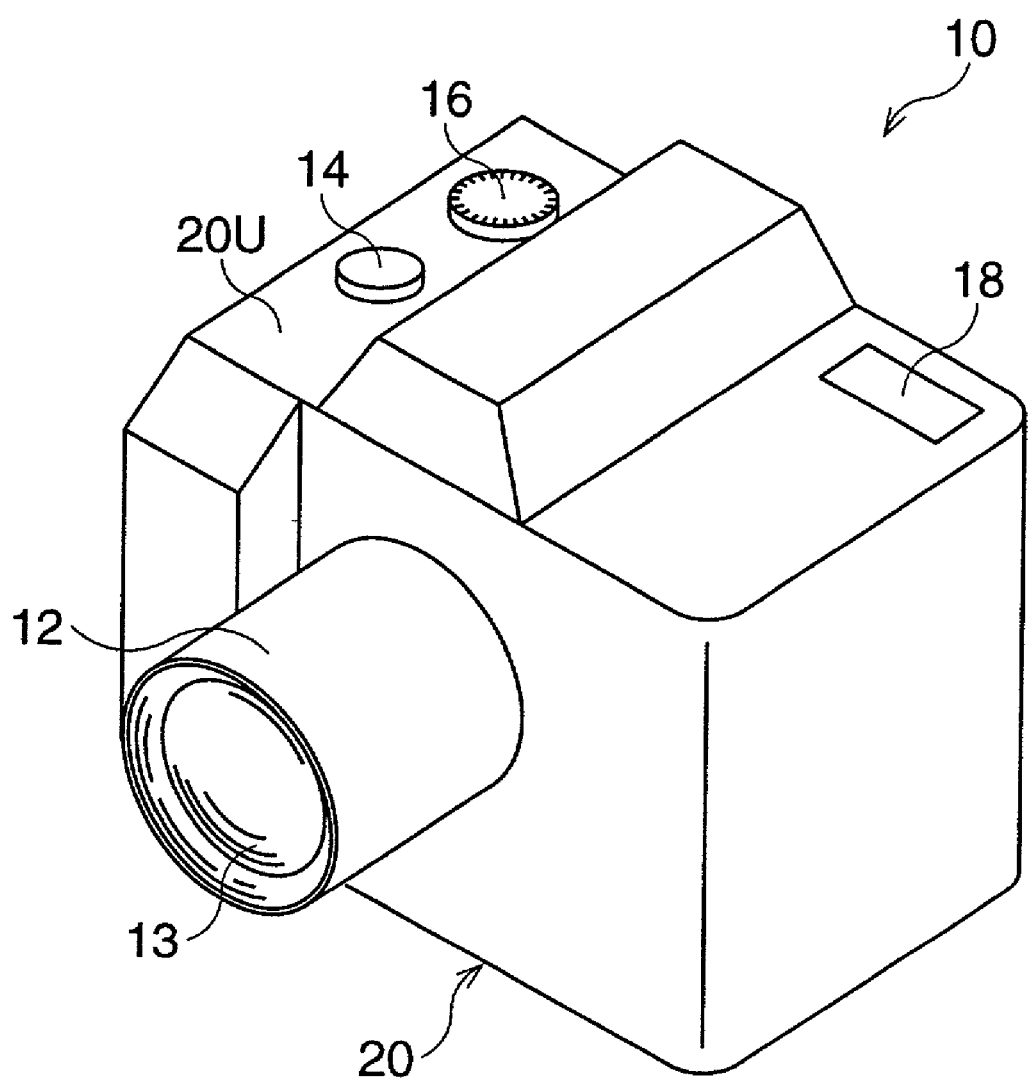
FIG. 1 is a perspective view of a digital still camera according to a first embodiment seen from the front.

FIG. 1 is a perspective view of a digital still camera of a first embodiment.

A digital still camera 10 has a lens barrel 12 with a photographing optical system 13 and a body 20, the lens barrel 12 being detachably connected to the body 20. In the first embodiment, the lens barrel 12 with the photographing optical system 13 is an interchangeable barrel. Namely, in this embodiment, the photographing optical system 13 used in an SLR (Single Lens Reflex) type camera using a photographic film is connected to the body 20 of the digital still camera 10.

The photographing optical system 13 has a zoom lens, an iris aperture (herein not shown) and a focus lens (not shown). Light reflected on a subject passes through the photographing optical system 13, thus a subject image is formed. On the lens barrel 12, an aperture (diaphragm) ring for manually setting an aperture value and a zoom ring for manually setting a focus length are provided (not shown).

On an upper surface 20U of the body 20, a release button 14, a selector 16 and a data-display 18 are provided. The release button 14 is depressed when capturing the subject image. The selector 16 is a dial lever for selecting one mode from a plurality of modes, such as an exposure mode and a playback mode, and so on. Further, the selector 16 has a function for turning electric power ON/OFF. On the data-display 18, character information corresponding to a selected mode is displayed.

Figure 2:
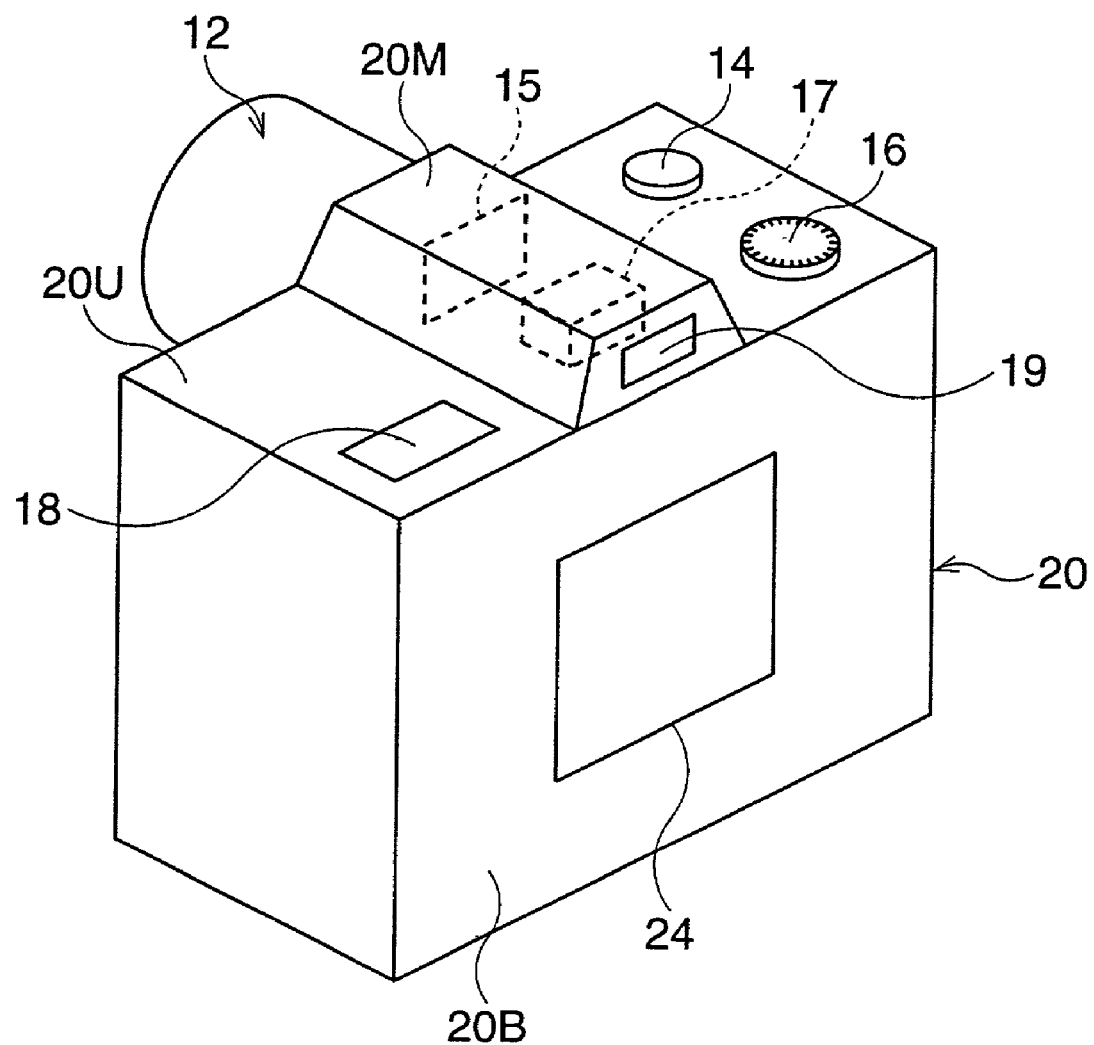
FIG. 2 is a perspective view of the digital still camera seen from the back.

FIG. 2 is a perspective view of the digital still camera 10 seen from the back side.

In a middle portion 20M formed at the upper surface 20U, an LCD (Liquid Crystal Display) panel 15 and a magnifying glass 17 are provided. The subject image displayed on the LCD panel 15 is optically magnified by the magnifying glass 17, so that the subject image is observed by the user via a window 19. A construction of the LCD panel 15 and the magnifying glass 17 has a function similar to a reflex finder, which is usually provided in an SLR type camera. On a back surface 20B of the body 20, a playback display panel 24, which is an LCD panel, is provided. When the playback mode is selected by the selector 16, a recorded subject image is reproduced on the playback display panel 24.

Figure 3:
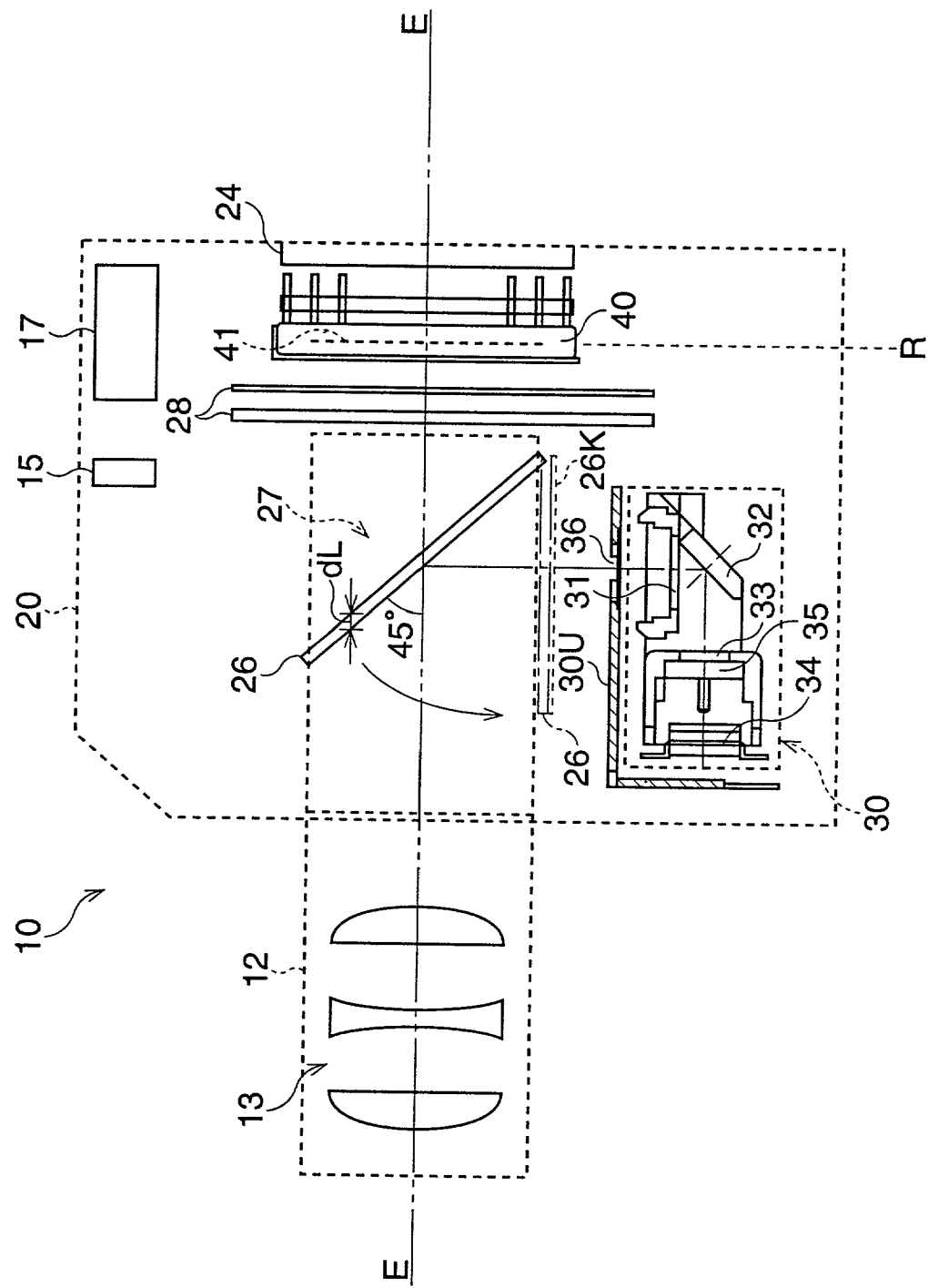
FIG. 3 is a view showing an inner arrangement of the digital still camera.

FIG. 3 is a schematic view showing an inner construction of the digital still camera 10.

As shown in FIG. 3, in the body 20, a half mirror 26, a shutter 28, a CCD (Charge-Coupled Device) 40, and an AF (Auto Focus) unit 30 are included in addition to the LCD panel 15 and the magnifying glass 17. The CCD 40 is arranged at the rear of the photographing optical system 13, along an optical axis E defined by the photographing optical system 13. A mirror box (light-path space) 27 is formed between the photographing optical system 13 and the CCD 40. Light, emitting from the photographing optical system 13, passes through the mirror box 27 toward the CCD 40. The half mirror 26, disposed in the mirror box 27, directs the light from the photographing optical system 13 to the CCD 40 and the AF unit 30. The half mirror 26 is inclined with respect to the optical axis E at the angle of 45 degrees. The half mirror 26 inclines toward the photographing optical system 13, as shown in FIG. 3.

The shutter 28 is a focal plane shutter composed of a first blind and a second blind. When the capturing mode is selected by the selector 16, the shutter 28 opens. Thus, the light passing through the photographing optical system 13 and the half mirror 26 reaches the CCD 40. Consequently, the subject image is formed on a light-receiving area 41 in the CCD 40.

On the light-receiving area 41, a plurality of photo-diodes is arranged in a matrix. Further, a primary color filter (not shown), checkered by red (R), green (G) and blue (B) color elements, is arranged on the photo-diodes. Light passing trough the color filter generates one frame worth of analog pixel signals in the CCD 40.

The one frame worth of the analog pixel signals is read from the CCD 40 in order at preset intervals. Thus, the subject image is displayed as a moving image on the LCD panel 15 in accordance with the read pixel signals. When the release button 14 is halfway depressed in a situation where the capturing mode is selected, an auto-focusing and a photo-metering operation are performed.

The AF unit 30, disposed under the half mirror 26, has a condenser lens 31, a reflecting mirror 32, a separator mask 33, a separator lens 35 and an auto-focus detecting sensor 34. The AF unit 30 detects the focus situation by a phase difference method (phase-matching method). A portion of the light from the photographing optical system 13 reflects on the half mirror 26 and enters into a guide-opening 36 formed on the AF unit 30. Note that, the upper surface 30U of the AF unit 30 is painted black for preventing reflection of light. The light directed in the AF unit 30 passes through the condenser lens 31 and reflects on the reflecting mirror 32, so that the light is directed toward the separator mask 33. Further, the light is divided into two light beams by the separator mask 33 and the separator lens 35. The two light beams reach the auto-focus detecting sensor 34, which is a CCD line sensor. Thus, two projected images are formed on the auto-focus detecting sensor 34.

The position of the light-receiving area 41 along the optical axis E is defined at the position R, which is set as a position of the focal plane. The focus adjustment is performed such that the subject image is focused at generally the position R, in other words, the focused subject image is formed at generally the position R along the optical axis E. An interval between the two project images formed on the auto-focus detecting sensor 34 in a situation where the focused subject image is formed at the position R, is defined as a based-interval and is recorded in a memory (not shown) as data in advance. When the release button 14 is halfway depressed, the interval between the two subject images formed on the auto-focus detecting sensor 34 is detected. Then, the detected interval is compared to the based-interval and it is determined whether or not the subject image is focused. When the subject image is focused, the detected interval substantially coincides with the based-interval. On the other hand, when the subject image is out of focus, or defocused, it can be determined whether the subject image is focused in the background or foreground. When the detected interval is longer than the based-interval, it is determined that the focus point is in the background, and when the detected interval is shorter than the based-interval, it is determined that the focus point is in the foreground. At this time, an amount of the defocus is simultaneously detected.

The focus lens in the photographing optical system 13 is removable along the optical axis E. When the amount of the defocus is detected, the focus lens is shifted in accordance with the amount of the defocus. Thus, the focused subject image is formed on the light-receiving area 41 and is then displayed on the LCD panel 15.

As for a metering method, an incident light metering method so called "TTL (Through The Lens) metering" is performed.

The brightness of the subject is detected on the basis of the pixel signals read from the CCD 40. In this embodiment, an average metering, a segment metering, or a spot metering is selected by the selector 16. Based on the brightness of the subject, an exposure value, namely, an aperture value and shutter speed is set.

When the release button 14 is fully depressed, the half mirror 26 moves toward the AF unit 30 so that the half mirror 26 comes off the mirror box 27. At this time, the half mirror 26 is contained in a mirror space 26K formed under the mirror box 27. The shutter 28 closes down immediately when the half mirror 26 starts to move, and then opens for a given period in accordance with the set exposure value. Thus, the CCD 40 is exposed and one frame worth of pixel signals is generated and read from the CCD 40. While the CCD 40 is exposed to record the still subject image, the moving subject image is not displayed on the LCD panel 15. When the given period passes, the shutter closes down and the half mirror 26 returns to an inclined position.

Note, when the auto focus adjustment is performed, the half mirror 26 is in the mirror box 27. Therefore, the focus point is slightly shifted by an optical path length (shown by "dL") of the half mirror 26. Accordingly, when the half mirror 26 falls down, the focus lens is shifted along the optical axis E by the optical path length.

Figure 4:
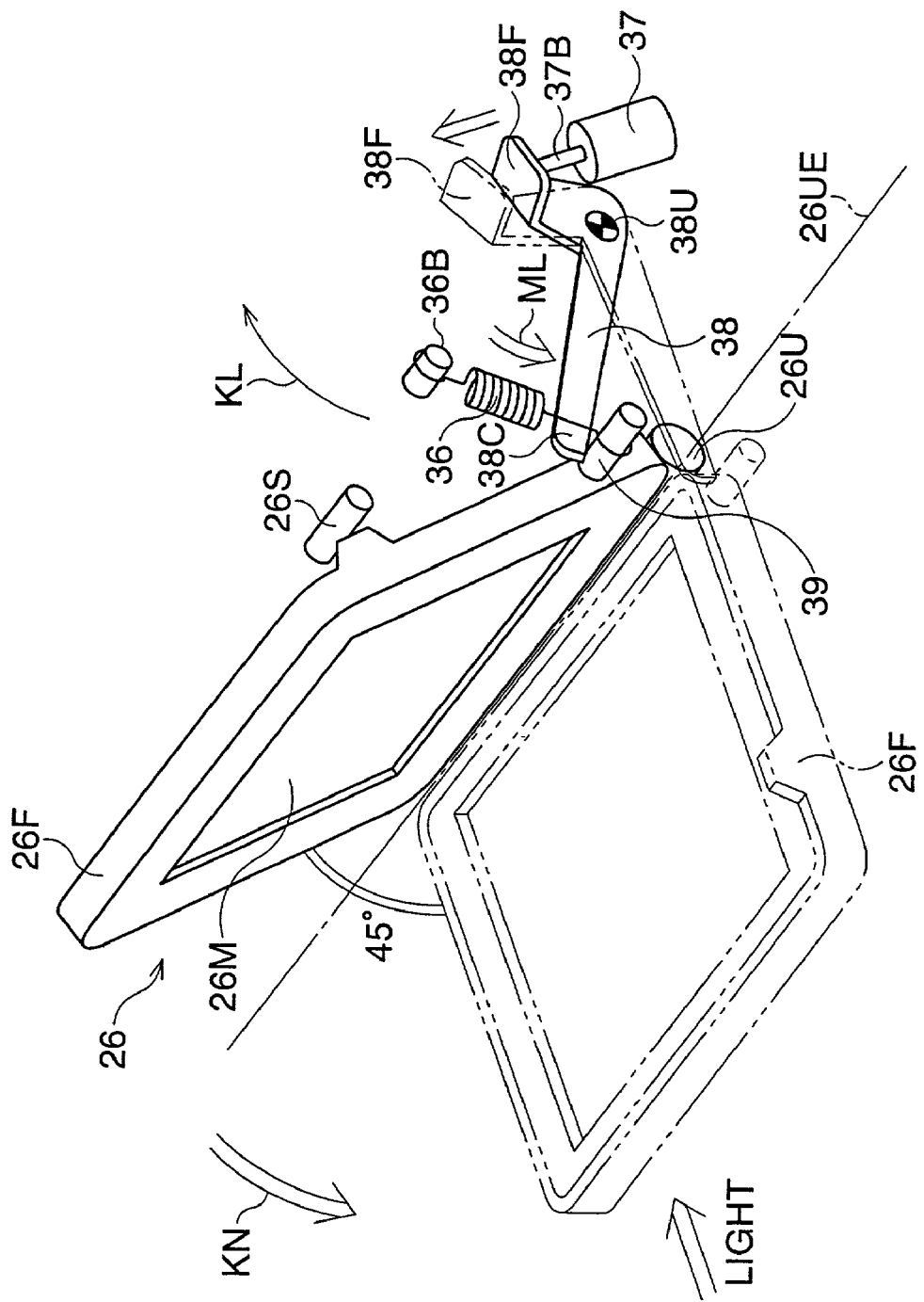
FIG. 4 is a perspective view of a half mirror.

FIG. 4 is a perspective view of the half mirror 26 seen from the photographing optical system side.

The half mirror 26 has a plate configuration and is composed of a mirror portion 26M and a frame 26F. The frame 26F is engaged with an engaging portion 26S, which is provided at one side (left side seen from the back surface 20B of the body 20) of the mirror box 27. An operating pin 39 is attached to the same side of the frame 26F and a mirror pin 26U is attached to the half mirror 26. The half mirror 26 is pivotable around a mirror axis 26UE of the mirror pin 26U.

A restoring spring 36 is suspended between the operating pin 39 and a spring-suspended pin 36B provided at the same side of the engaging portion 26S in the mirror box 27. The restoring spring 36 expands and contracts between the operating pin 39 and the spring-suspended pin 36B. At the restoring spring 36, a tension, which tensions the half mirror 26 toward the back surface 20B, occurs. This tension operates toward the back surface 20B, as shown by the arrow KL. However, as the frame 26 is engaged with the engaging portion 26S, the half mirror 26 is positioned at the angle of 45 degrees.

An operating lever 38 is pivotable around a lever pin 38U attached to the left side of the mirror box 27, and the point 38C of the operating lever 38 engages with the operating pin 39. A rod (plunger) 37 is a member for pivoting the operating lever 38 around the lever pin 38U. An operating portion 38F of the operating lever 38 engages with an operating pin 37B attached to the point of the rod 37.

When the release button 14 is fully depressed, the rod 37 is displaced upward so as to push up the operating portion 38F of the operating lever 38, so that the operating lever 38 pivots around the lever pin 38U counterclockwise, as shown by the arrow ML. At the operating pin 39, a moment is produced by the pivoting of the operating lever 38. Thus, the half mirror 26 pivots around the mirror pin 26U counterclockwise, as shown by the arrow KN, such that the half mirror 26 becomes parallel to the optical axis E. All of the light from the photographing optical system 13 directly advances toward the CCD 40.

After the CCD 40 is exposed for the given period corresponding to the shutter speed, the rod 37 is replaced to the original position. Since the operating portion 38F of the operating lever 38 is not pushed up by the rod 37 and further because the tension described above operates on the operating pin 39, the half mirror 26 is replaced to the position of 45 degrees.

Figure 5:
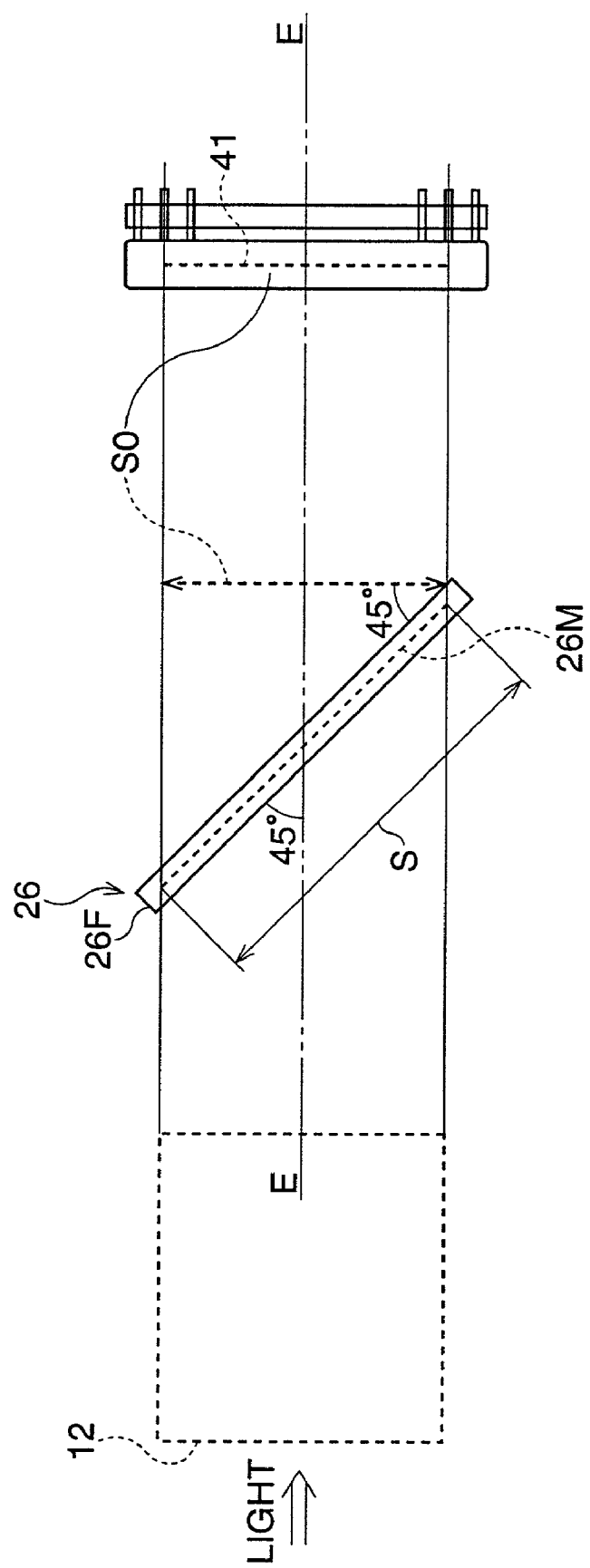
FIG. 5 is a view showing an arrangement of the half mirror.

FIG. 5 is a schematic side view of the half mirror 26.

In this embodiment, the size of the mirror portion 26M and the arrangement of the half mirror 26 are defined such that all of the light directed from the photographing optical system 13 to the light-receiving area 41 passes through the mirror portion 26M. When no part of the light from the photographing optical system 13 reflects on the frame 26F, namely, a "vignetting" does not occurs. In order not to generate vignetting, the area size of the mirror portion 26M is defined such that the following formula is satisfied. Note that, the area size of the mirror portion 26M is represented by "S" and the size of the light-receiving area 41 is represented by "S0".

$$S \geq S0/\sin 45° = 2^{1/2} \times S0 \qquad (1)$$

When the formula (1) is satisfied, the path of light to be directed to the light-receiving area 41 is not interrupted by the frame 26F.

Note that, when the half mirror 26 moves such that the half mirror 26 becomes parallel to the optical axis E, the half mirror 26 is positioned outside of the path of the light directed to the light-receiving area 41. Further, elements for pivoting the half mirror 26, such as the operating lever 38, the engaging portion 39, etc. (See FIG. 4), also don't interrupt the light path.

Figure 6:
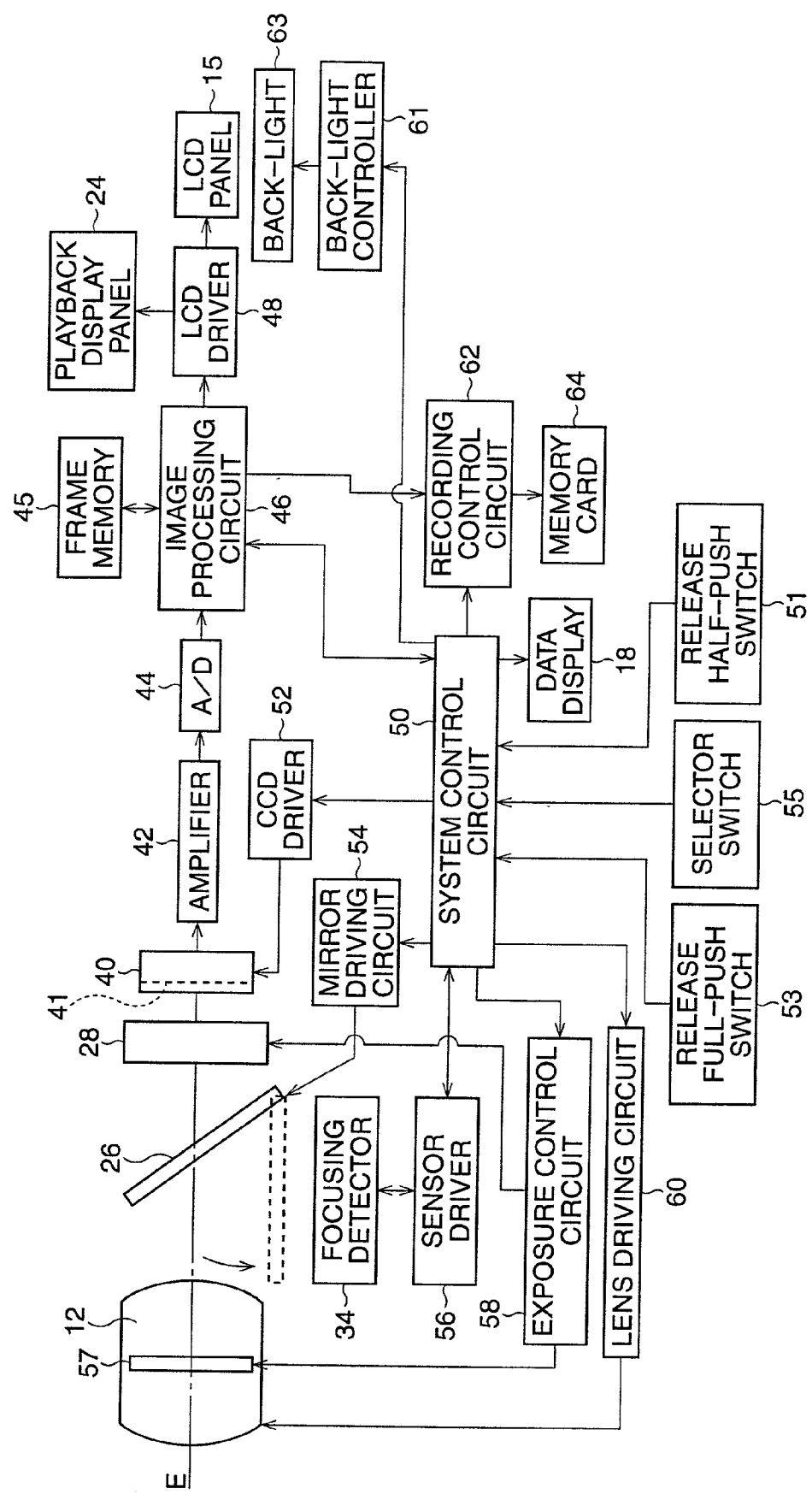
FIG. 6 is a block diagram of the digital still camera of the first embodiment.

FIG. 6 is a block diagram of the digital still camera.

A system control circuit 50 including a CPU (not shown) controls the digital still camera 10. A release half-push switch 51, a release full-push switch 53, the data-display 18 and a selector switch 55 corresponding to the selector 16 are connected to the system control circuit 50. Note that, electric power is supplied to each circuit in the digital still camera 10 by a battery (not shown).

When the selector 16 shown in FIG. 1 is operated, a signal corresponding to a selected mode is fed from the selector switch 55 to the system control circuit 50. In the case of the capturing mode, a process for displaying the subject image as a moving image is performed. Namely, the subject image is formed on the CCD 40 by the light passing through the half mirror 26, and one frame worth of the pixel signals is generated and fed from the CCD 40 to an amplifier 42, in order.

In the amplifier 42, the pixel signals are amplified and then are fed to an A/D converter 44. In the A/D converter 44, the analog pixel signals are converted to digital image signals. The digital image signals are fed to an image processing circuit 46, wherein various processes, such as a white balance and a gamma correction, are performed on the digital image signals. The processed image signals are fed to an LCD driver 48. In the LCD driver 48, control signals are output to the LCD panel 15 in accordance with the digital image signals. A back-light 63 is turned ON by a driving signal from a back-light controller 61. Thus, the subject image is displayed on the LCD panel 15 as a moving image.

When the release button 14 shown in FIG. 1 is halfway depressed, the release half-push switch 51 is turned ON. Thus, the TTL metering and the focus adjustment is performed. Based on the digital image signals fed to the system control circuit 50, the brightness of the subject is detected. Then, the exposure value (the aperture value and the shutter speed) is calculated in accordance with the brightness. Further, in the system control circuit 50, based on signals fed from the AF unit 30, the focus point is detected, namely, it is determined whether the subject image is focused. The focus lens in the photographing optical system 13 is driven by a lens driving circuit 60 such that the subject image is focused at the position R along the optical axis E, as shown in FIG. 4. The auto-focus detecting sensor 34 is driven by a sensor driver 56.

When the release button 14 is fully depressed and a release full-push switch 53 is turned ON, a process for recording a still image is performed. Firstly, a control signal for pivoting the half mirror 26 is fed from the system control circuit 50 to a mirror driving circuit 54 so that the half mirror 26 moves such that the half mirror 26 is parallel to the optical axis E. Further, a driving signal for driving the focus lens by the light path "dL" of the half mirror 26 is fed to the lens driving circuit 60 so as to compensate for the change in focus point, as described above by using FIG. 3. At this time, a driving amount of the lens focus is read from the memory (not shown) in the system control circuit 50. Thus, the focused subject image is formed on the light-receiving area 41 in the CCD 40. An exposure control circuit 58 drives the iris aperture 57 and the shutter 28 in accordance with the exposure value obtained at the system control circuit 50.

The CCD 40 is exposed for the given period by driving the iris aperture 57 and the shutter 28, so that one frame worth of the pixel signals is read from the CCD 40, and is subjected to the process described above in the amplifier 42, the A/D converter 44, and the image processing circuit 46. The generated digital image signals are temporarily stored in a frame memory 45.

The stored digital image signals are fed to a recording control circuit 62 via the system control circuit 50. In the recording control circuit 62, the digital image signals are compressed. The compressed image signals are recorded in a memory card 64 as still image data.

When the playback mode is selected by the selector 16, the still image data is read from the memory card 64 and is subjected to an expansion process at the recording control circuit 62. The expanded image data is temporarily stored in the frame memory 45. Then, the digital image signals are fed to the LCD driver 48. The LCD driver 48 drives the playback display panel 24 in accordance with the digital image signals, thus the recorded still image is displayed on the playback display panel 24. Note that, the playback display panel 24 is a reflection type LCD panel, which can display an image by using natural light, namely, external light.

Note that, at a connecting portion between the lens barrel 12 and the body 20, pins for transmitting a signal associated with a driving of the lens are arranged (not shown). When the lens barrel 12 is connected to the body 20, driving signals output from the exposure control circuit 58 and lens driving circuit 60 are fed to the lens barrel 12 via the pins as required.

Figure 7:
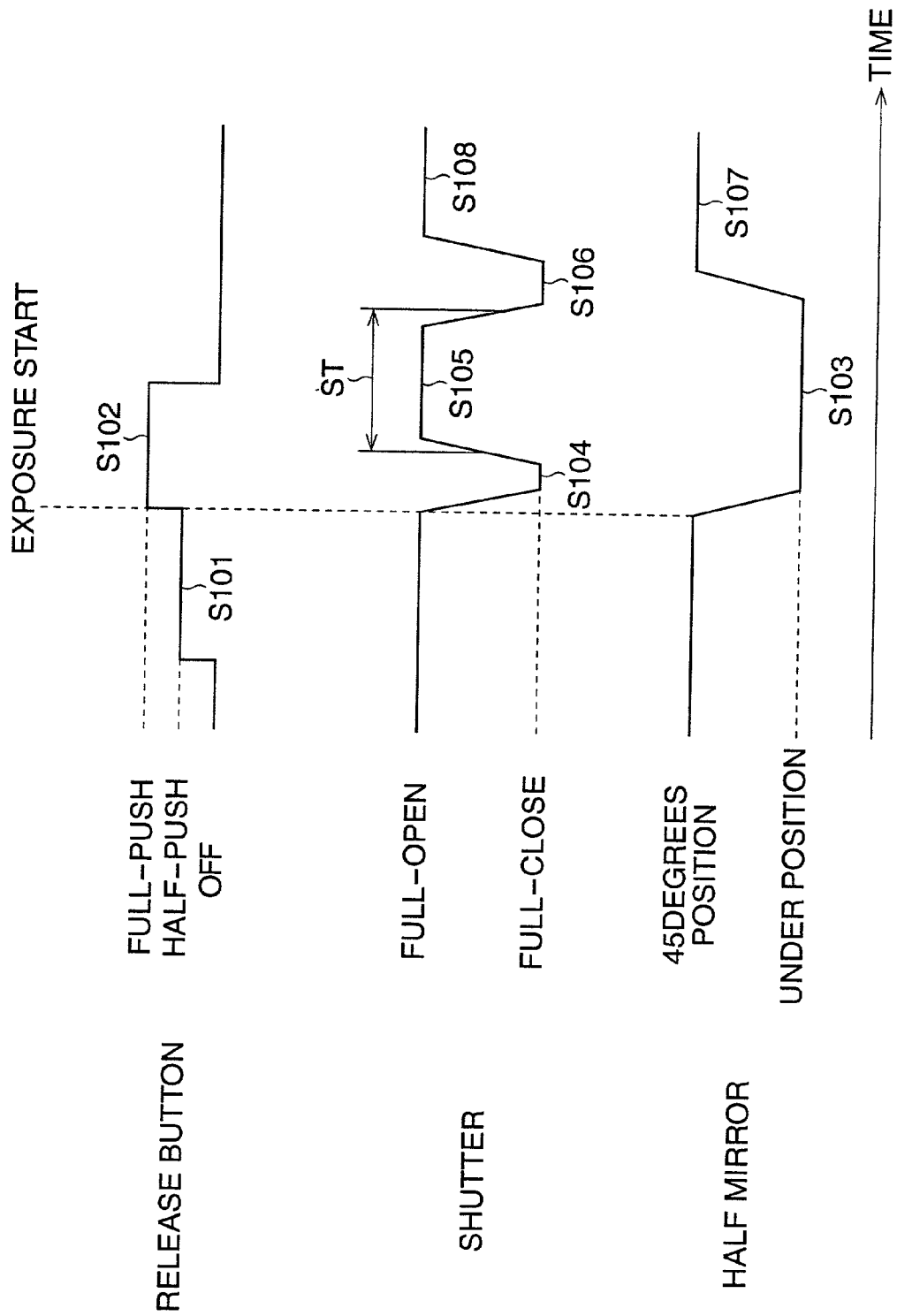
FIG. 7 is a view showing a timing chart.

FIG. 7 is a timing chart associated with the exposure. Herein, the capturing mode is selected and firstly the subject image is displayed on the LCD panel 15.

While the release button 14 is halfway depressed (See reference S101), the shutter 28 is full-open and the half mirror 26 is positioned at the angle of 45 degrees. When the release button 14 is fully depressed (See reference S102), the half mirror 26 moves under the mirror box 27 (See reference S103) and the shutter 28 temporarily closes down (See reference S104). Then, after the half mirror 26 moves, the shutter opens for the given period "ST" corresponding to the preset shutter speed (See reference S105). During the period ST, the subject image is not displayed on the LCD panel 15. After the period ST passes, the shutter 28 temporarily closes down (See reference S106) and the half mirror 26 returns to the original position of 45 degrees. Then, the shutter 28 opens again (See reference S108). Thus, the subject image is displayed on the LCD panel 15 again.

In this way, according to the first embodiment, the AF unit for detecting the focus by the phase difference method is applied and the single half mirror 26 is provided in the mirror box 27. As the phase difference method, which is superior to the contrast detecting method, is applied, the focus detection and the focus adjustment are rapidly performed. Then, as the size of the mirror portion 26M satisfies the formula (1), vignetting is not caused by reflection of the light on the frame 26F, therefore, the total subject image to be recorded is displayed on the LCD panel 15 without a partial lack of the subject image.

In the case of an SLR type digital camera, the construction of which corresponds to that of an SLR type camera using photographic film, the image sensor is not utilized as a metering sensor, and an exclusive metering sensor must be provided adjacent to the reflex finder. On the other hand, in this embodiment, as the total subject image is formed on the light-receiving area 41, the various metering methods including average metering and segment metering can be applied by utilizing the image sensor 41. Further, in this embodiment, the photographing optical system, which is interchangeable and has been used for SLR type cameras using photographic film, can be connected to the body 20.

While the capturing mode is selected, the subject image formed on the CCD 40 is observed via the LCD panel 15. Therefore, the user can confirm the subject image to be recorded.

The half mirror 26 operates such that the half mirror 26 is positioned at the outside of the mirror box 27 while the CCD 40 is exposed. Thus, a decrease of light-amount is prevented, so that a high image-quality subject image is recorded.

In this embodiment, as the AF unit 30 is arranged under the mirror box 27, the half mirror 26 is supported at the angle of 45 degrees with respect to the optical axis E. However, the angle and position of the half mirror 26 may be defined in accordance with a given arrangement position of the AF unit 30. In this case, the size of the mirror portion 26M depends upon the following formula.

$$S \geq S0/\sin\theta \quad 0<\theta<180° \text{(except for 90°)} \qquad (2)$$

Namely, a size of the half mirror is equal to or larger than the light-receiving area and the half mirror is angled to the optical axis such that a projection area of the half mirror along the optical axis becomes equal to or larger than the light-receiving area. Note that, "θ" indicates an angle to the optical axis E.

In this embodiment, the shutter 28 is provided between the half mirror 26 and the CCD 40, however, an electronic shutter which adjusts the exposure period by adjusting a read-timing of the pixel signals may be applied in place of the shutter 28.

Figure 8:
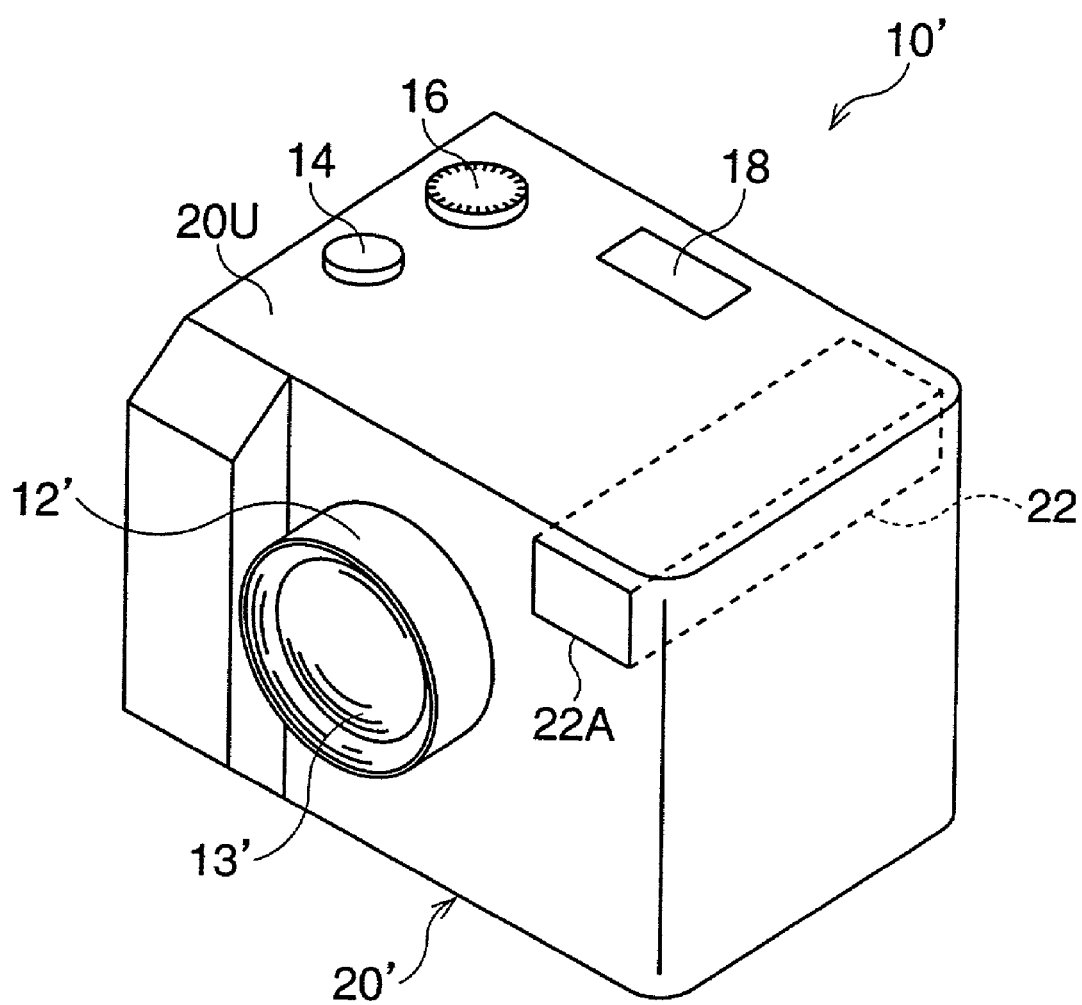
FIG. 8 is a perspective view of a digital still camera according to a second embodiment seen from the front.
Figure 9:
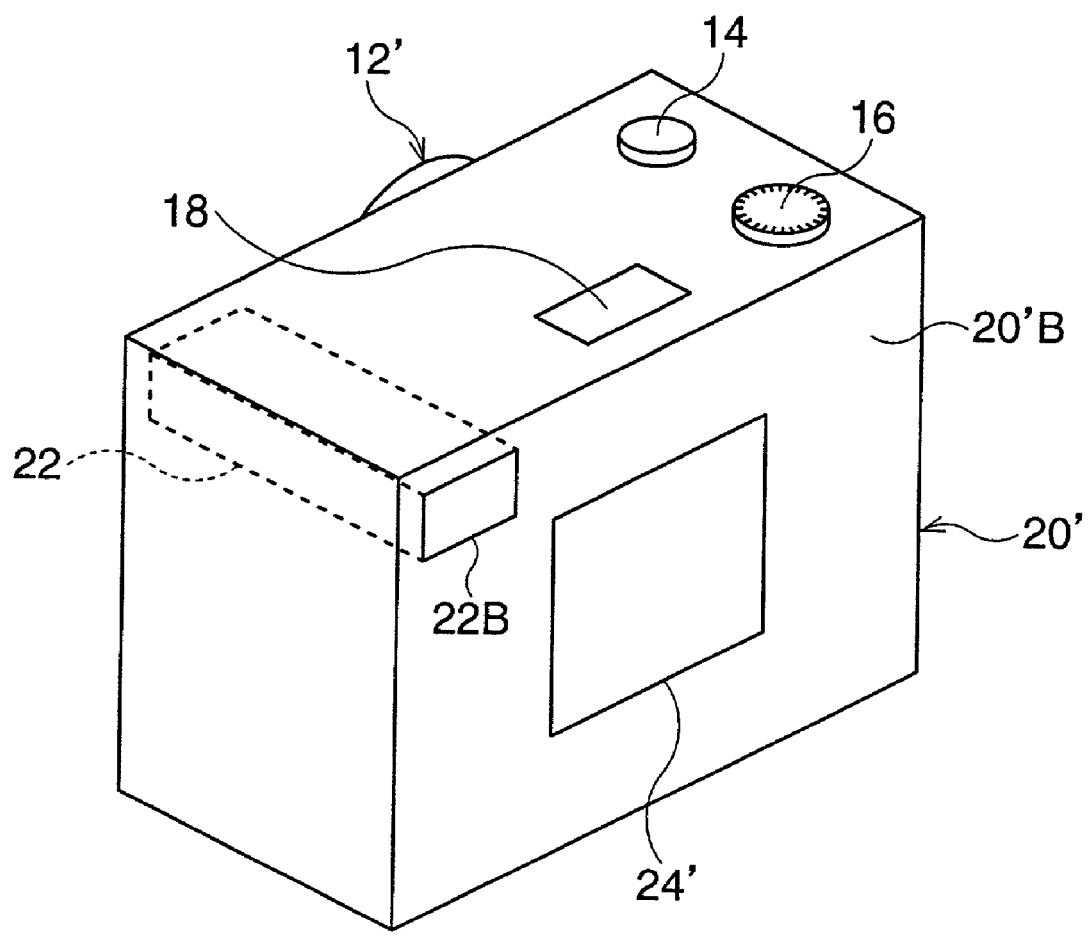
FIG. 9 is a perspective view of the digital still camera according to the second embodiment seen from the back.
Figure 10:
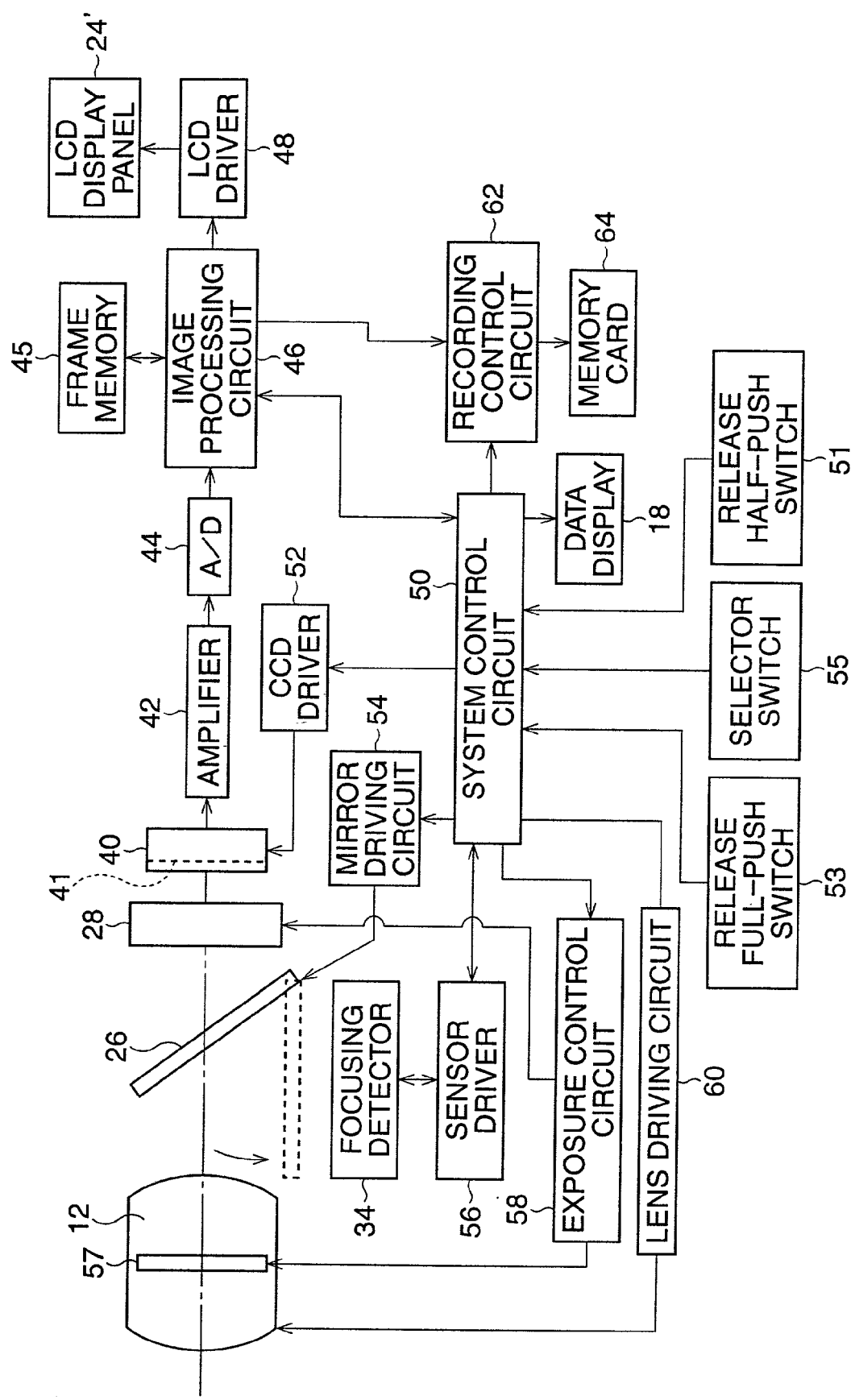
FIG. 10 is a block diagram of the digital still camera according to the second embodiment.

FIGS. 8 to 10 show a second embodiment of a digital still camera. The second embodiment is different from the first embodiment in that a viewfinder is provided and a moving image is displayed on a back surface of the body. Since other portions are similar to those of the first embodiment, designations remain the same and the explanation is omitted.

FIG. 8 is a perspective view of a digital still camera of the second embodiment seen from a front side and FIG. 9 is a perspective view of the digital still camera seen from a back side.

A lens barrel 12' with a photographing optical system 13' is not interchangeable but fixed to a body 20'. The lens barrel 12' is an exclusive barrel for a digital still camera 10'. A viewfinder 22 is provided at the body 20', light from the subject directly enters into an objective lens 22A of the viewfinder 22. As shown in FIG. 9, an eyepiece (ocular) 22B of the viewfinder 22 is provided on a back surface 20'B of the body 20', and an LCD display panel 24' for displaying a recorded image and a moving image is provided on the back surface 20'B. The observer can confirm the visual filed of the subject image to be recorded by the viewfinder 22, further, while the capturing mode is selected, the subject image is displayed on an display LCD panel 24' as a moving image.

FIG. 10 is a block diagram of the digital still camera 10' of the second embodiment.

Similarly to the first embodiment, when the capturing mode is selected, the pixel signals are read from the CCD 40 in order, and fed to an amplifier 42, an A/D converter 44 and an image processing circuit 46. An LCD driver 48 drives the LCD display panel 24' in accordance with image signals fed from the image processing circuit 46. Thus, the subject image is displayed on the LCD display panel 24'.

In this way, according to the second embodiment, focus detecting using the phase difference method can be applied for the digital still camera 10', an inner construction of which is generally similar to that of a mass-produced digital still camera. On the other hand, the half mirror 26 is provided in the mirror box 27, which is different from the mass-produced digital still camera. Similarly to the first embodiment, the half mirror 26 is arranged such that the light directed from the photographing optical system 13 to the CCD 40 passes the half mirror 26.

FIGS. 11 to 14 show a third embodiment of a digital still camera. The third embodiment is different from the first embodiment in that a half mirror does not pivot and a display panel is not provided. Since other portions are similar to those of the first embodiment, designations remain the same and the explanation is omitted.

Figure 11:
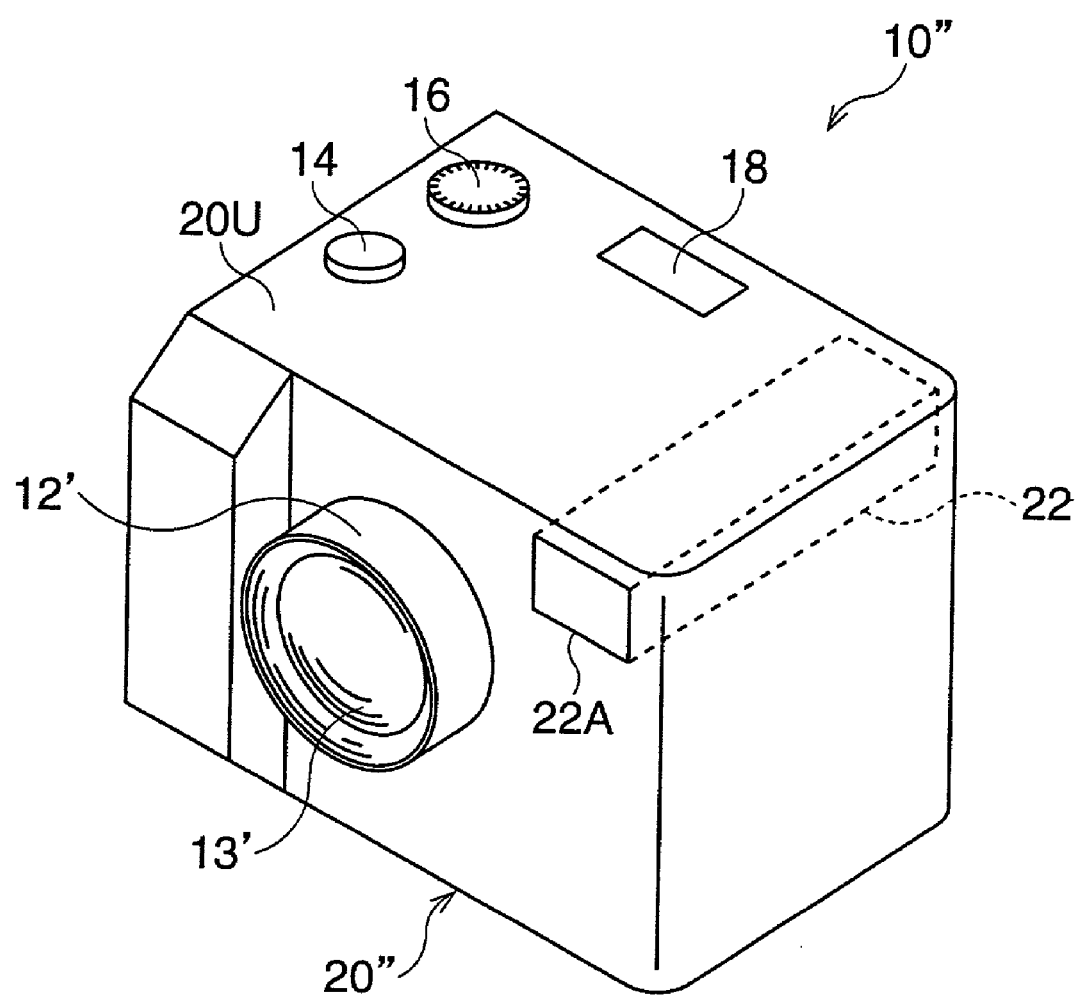
FIG. 11 is a perspective view of a digital still camera according to a third embodiment seen from the front.
Figure 12:
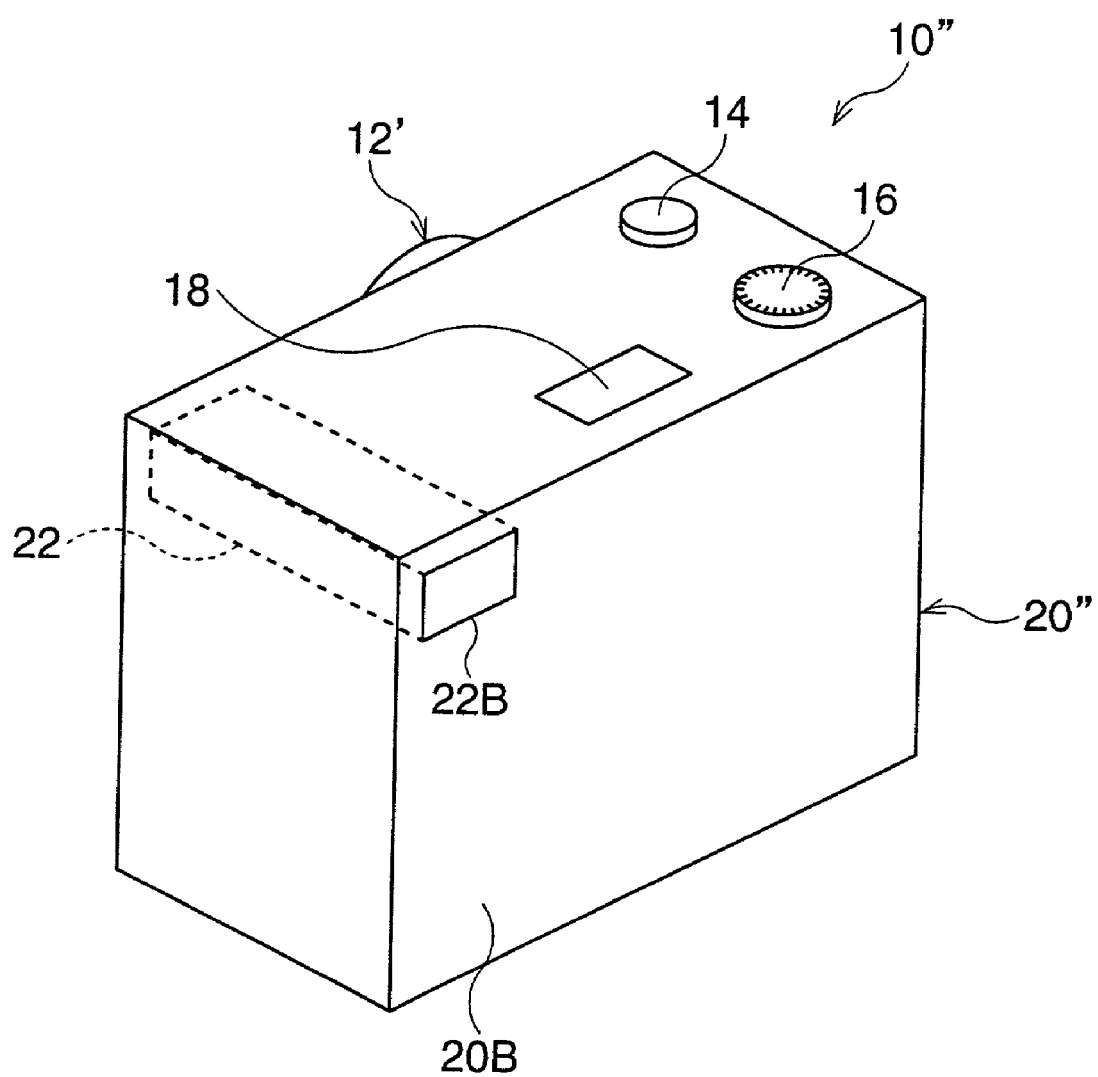
FIG. 12 is a perspective view of the digital still camera according to the third embodiment seen from the back.

FIG. 11 is a perspective view of a digital still camera of the third embodiment seen from the front side and FIG. 12 is a perspective view of the digital still camera seen from the back side. As shown in FIG. 12, an LCD panel is not provided on a back surface 20" of a body 20".

Figure 13:
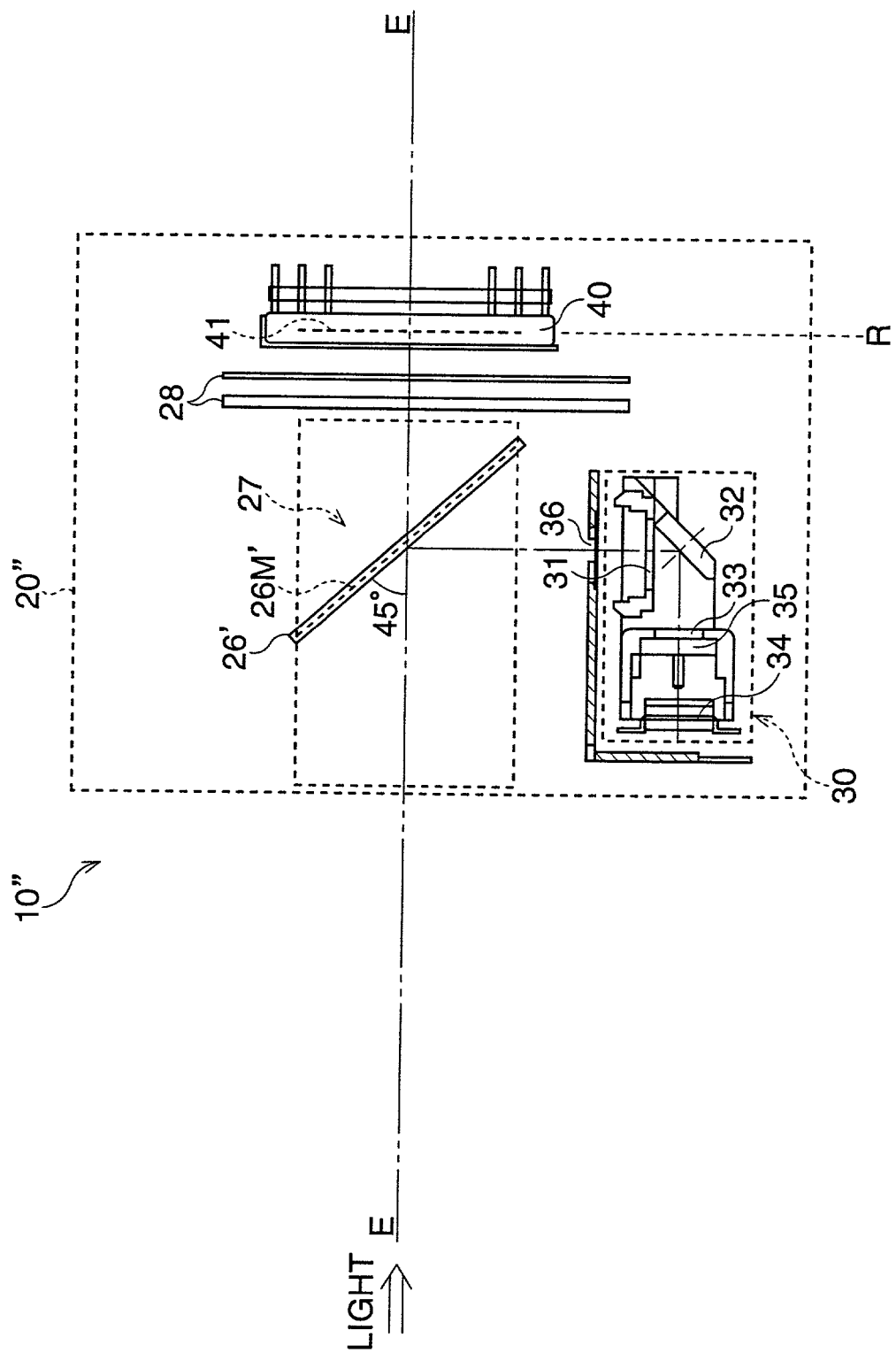
FIG. 13 is a view showing an inner arrangement of the digital still camera according to the third embodiment.

FIG. 13 is a schematic view showing an inner portion of the digital still camera of the third embodiment.

Similarly to the first embodiment, a size of a mirror portion 26"M of a half mirror 26" satisfies the formula (1), therefore, all of the light from the photographing optical system 13' pass through the mirror portion 26"M and reaches the light-receiving area 41 in the CCD 40. When the release button 14 is fully depressed, the shutter 28 opens for a given period, so that one frame worth of the pixel signals is read from the CCD 40. While the CCD 40 is exposed, the half mirror 26 does not pivots.

Figure 14:
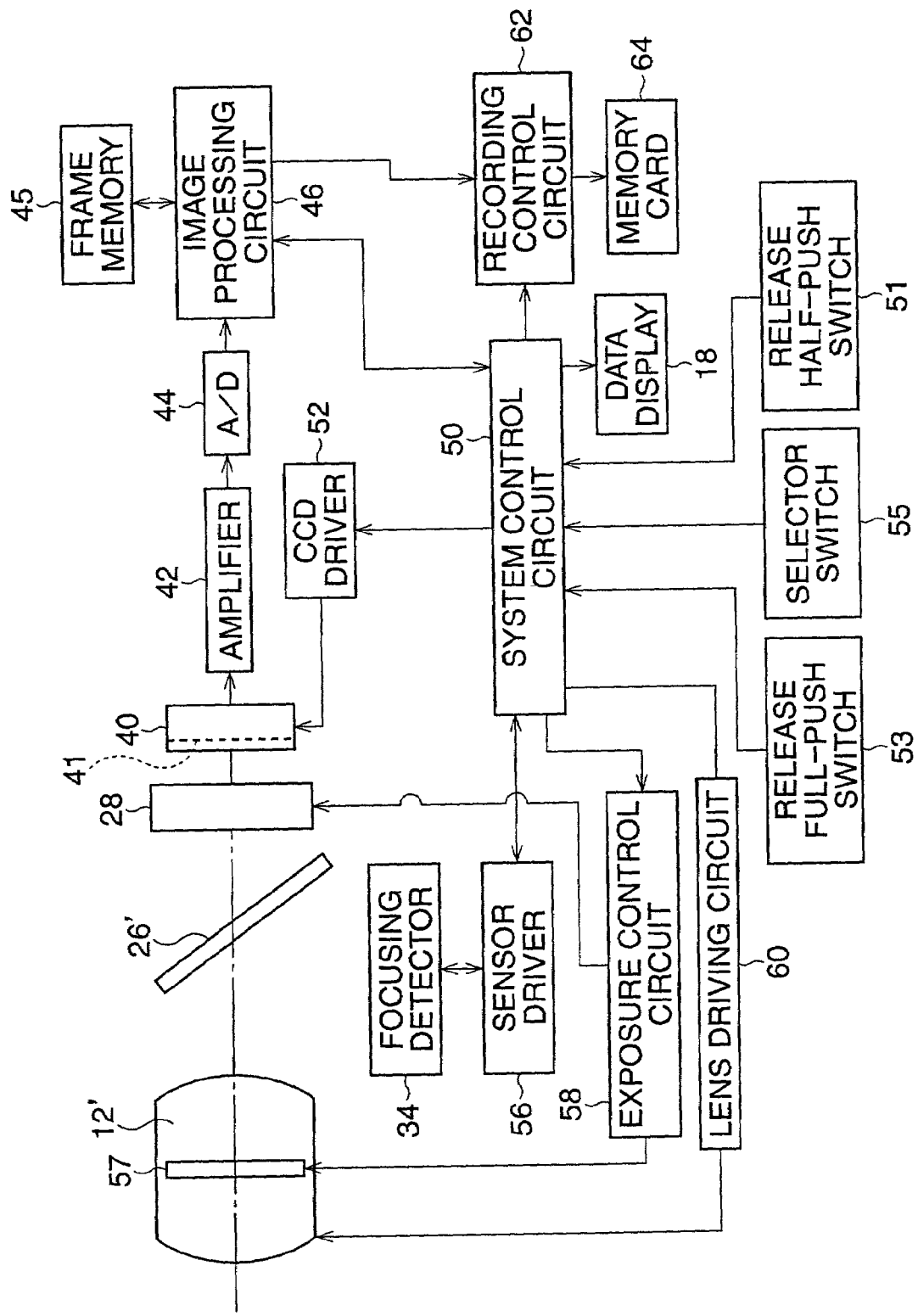
FIG. 14 is a block diagram of the digital still camera according to the third embodiment.

FIG. 14 is a block diagram of the digital still camera 10".

When the release button 14 is halfway depressed, the TTL metering and auto focus adjustment are performed, then, when the release button 14 is fully depressed, the subject image is recorded in the memory card 64, similarly to the first embodiment. Note that, as the half mirror 26' does not pivot, the compensation for light passing through the mirror 26', namely, the path-length "dL" (See FIG. 3), performed in the first embodiment, is not performed in the third embodiment.

In this way, according to the third embodiment, the subject image can be recorded without an LCD panel for confirming the subject image to be recorded. Therefore, the inner construction of the digital still camera 10" is more simplified and a low-cost digital still camera can be provided.

Note that, only the focus detecting may be firstly performed when a release button is halfway depressed and the focus adjustment may be performed just before the exposure, similarly to a simplified digital still camera.

In the first to third embodiments, the auto-focus detecting and adjustment are performed when the release button is depressed halfway. However, when the capturing mode is selected, the auto-focus detecting and adjustment may be performed without depression.

Finally, it will be understood by those skilled in the art that the foregoing descriptions of preferred embodiments of the device, and that various changes and modifications may be made to the present invention without departing from the spirit and scope thereof.

The present disclosure relates to subject matters contained in Japanese Patent Application No. 2000-188945 (filed on Jun. 23, 2000) which is expressly incorporated herein, by reference, in its entirety.

What is claimed is:

1. A digital still camera comprising:
    a photographing optical system that forms a subject image by capturing a subject;
    a body, to which said photographing optical system is connected;
    an image sensor provided in said body behind said photographing optical system along an optical axis defined by said photographing optical system, light from said photographing optical system passing through a light-path space formed between said photographing optical system and said image sensor along the optical axis, the subject image being formed on a light-receiving area of said image sensor by the light;

a half mirror, provided in said light-path space and inclined toward the photographing optical system, that directs the light from said photographing optical system toward said image sensor and along a focus detecting direction distinct from the optical axis;

a mirror driver that temporarily moves said half mirror to a predetermined position such that said half mirror does not interrupt a light-path of the light directed from said photographing optical system to said light-receiving area;

a phase difference focus detector provided outside said light-path space and along the focus detecting direction, that detects whether the subject image is focused in accordance with a phase difference of light directed by said half mirror;

a focus adjuster that focuses the subject image in accordance with the phase difference, said focus adjuster comprising a focusing lens; and a recording processor that exposes said image sensor for a predetermined period, controls said mirror driver to temporarily move said half mirror out of said light-path space while said image sensor is exposed, controls said focus adjuster to temporarily shift said focusing lens along the optical axis by an optical path length of said half mirror while said image sensor is exposed, and records the subject image as data in a recording medium provided in said body;

wherein said half mirror is positioned in said light-path space such that all of the light directed from said photographing optical system to said image sensor substantially passes through said half mirror.

2. The digital still camera of claim 1, wherein a size of said half mirror is at least equal to a size of said light-receiving area and said half mirror is angled with respect to the optical axis such that a projection area of said half mirror along the optical axis is at least equal to the size of said light-receiving area.

3. The digital still camera of claim 1, further comprising a viewfinder that forms an observed optical subject image.

4. The digital still camera of claim 1, further comprising an incident light metering processor that detects brightness of the subject in accordance with the subject image formed on said light-receiving area.

5. The digital still camera of claim 1, further comprising:
a moving image display for displaying the subject image as a moving image; and
a displaying processor that displays the subject image on said display on the basis of the pixel signals read from said image sensor.

6. The digital still camera of claim 5, wherein said moving image display is arranged in said body, and
wherein said body includes a magnifying optical system that magnifies the subject image displayed on said moving image display, said magnifying optical system being positioned behind said moving image display such that the subject image is observable from outside of said body.

7. The digital still camera of claim 5, wherein said moving image display is provided on a back surface of said body.

8. The digital still camera of claim 1, further comprising a shutter provided between said half mirror and said image sensor, and configured to open and close,
wherein said recording processor temporarily closes said shutter until said half mirror is moved out of said light-path space and opens said shutter for a given period after said half mirror is moved out of said lightpath space.

9. The digital still camera of claim 1, wherein said photographing optical system is an interchangeable optical system used with an SLR (Single Lens Reflex) camera using a photographic film.

10. A digital still camera comprising:

a photographing optical system that forms a subject image by capturing a subject;

a body, to which said photographing optical system is connected;

an image sensor provided in said body behind said photographing optical system along an optical axis defined by said photographing optical system, light from said photographing optical system passing through a light-path space formed between said photographing optical system and said image sensor along the optical axis, the subject image being formed on a light-receiving area of said image sensor by the light;

a half mirror, provided in said light-path space and inclined toward said photographing optical system, that directs the light from said photographing optical system toward said image sensor and along a focus detecting direction distinct from the optical axis;

a mirror driver that temporarily moves said half mirror to a predetermined position such that said half mirror does not interrupt a light-path of the light directed from said photographing optical system to said light-receiving area; and a phase difference focus detector provided outside said light-path space and along the focus detecting direction, that detects whether the subject image is focused in accordance with a phase difference of light directed by said half mirror;

a focus adjuster that focuses the subject image in accordance with the phase difference, said focus adjuster comprising a focusing lens; and a recording processor that controls said focus adjuster to temporarily shift said focusing lens along the optical axis by an optical path length of said half mirror while said image sensor is exposed, wherein said half mirror is positioned in said light-path space such that all of the light directed from said photographing optical system to said image sensor substantially passes through said half mirror.

* * * * *